US012043972B1

(12) United States Patent
Elder

(10) Patent No.: US 12,043,972 B1
(45) Date of Patent: Jul. 23, 2024

(54) CONNECTOR FOR DOCK SECTIONS

(71) Applicant: Snap Dock, LLC, Carmel, IN (US)

(72) Inventor: Blake Elder, Charlotte, NC (US)

(73) Assignee: Snap Dock, LLC, Carmel, IN (US)

( * ) Notice: Subject to any disclaimer, the term of this patent is extended or adjusted under 35 U.S.C. 154(b) by 486 days.

(21) Appl. No.: 17/336,536

(22) Filed: Jun. 2, 2021

Related U.S. Application Data

(60) Provisional application No. 63/035,397, filed on Jun. 5, 2020.

(51) Int. Cl.
*E02B 3/06* (2006.01)
*B63C 1/02* (2006.01)
*F16B 2/20* (2006.01)

(52) U.S. Cl.
CPC .............. *E02B 3/064* (2013.01); *B63C 1/02* (2013.01); *E02B 3/068* (2013.01); *F16B 2/20* (2013.01)

(58) Field of Classification Search
CPC . E02B 3/00; E02B 3/064; E02B 3/068; E02B 3/08; F16B 2/00; F16B 2/20; F16B 19/1027; B63C 1/00; B63C 1/02
USPC ........................................................ 114/264
See application file for complete search history.

(56) References Cited

U.S. PATENT DOCUMENTS

| 5,281,055 | A | 1/1994 | Neitzke et al. |
|---|---|---|---|
| 6,006,687 | A | 12/1999 | Hillman et al. |
| 6,840,188 | B1 | 1/2005 | Witbeck |
| 7,069,872 | B2 | 7/2006 | Ostreng et al. |
| 7,100,527 | B2 | 9/2006 | Munro |
| 7,293,522 | B1 | 11/2007 | Elson |
| 7,481,175 | B2 | 1/2009 | Dickman |
| 7,918,178 | B2 | 4/2011 | Imel et al. |
| 8,256,366 | B2 | 9/2012 | Imel et al. |
| 8,608,407 | B1 * | 12/2013 | Vaughn ................. B63B 35/38 405/219 |
| 9,051,953 | B2 * | 6/2015 | Imel .................... F16B 19/1027 |
| 2005/0172876 | A1 | 8/2005 | Ostreng et al. |
| 2006/0272566 | A1 | 12/2006 | Rueckert |

(Continued)

OTHER PUBLICATIONS

EZ Dock, Product Brochure, EZ Dock, Inc., 2018, 32 pages.

(Continued)

*Primary Examiner* — Lars A Olson
(74) *Attorney, Agent, or Firm* — Bose McKinney & Evans LLP

(57) ABSTRACT

A connector assembly for use with floating dock sections which includes a pair of buoyant connecting members. Each of the connecting members define a plurality of voids and have first and second retaining sections with a connecting section disposed between the retaining sections. The retaining sections are removably installable in sockets in the floating dock sections. At least one securement member is provided and extends between the pair of connecting members when the connecting members are installed in aligned sockets on the upper and lower perimeters of a pair of adjacent dock sections. The securement member detachably secures the connecting members. The plurality of voids may have open ends. The assembly may include a threaded elongate securement member which is captured by the one of the connecting members wherein the combination of the connecting member and the captured elongate securement member is buoyant.

12 Claims, 14 Drawing Sheets

(56) References Cited

U.S. PATENT DOCUMENTS

2009/0145345 A1   6/2009   Newcomb

OTHER PUBLICATIONS

EZ Dock Floating Docks Owner's Manual and Installation Instructions for Dock Sections, Anchoring and Accessories, Owner's Manual, EZ Dock, Inc., 2015, 54 pages.
Admitted Prior Art, Drawing, 1 page.

* cited by examiner

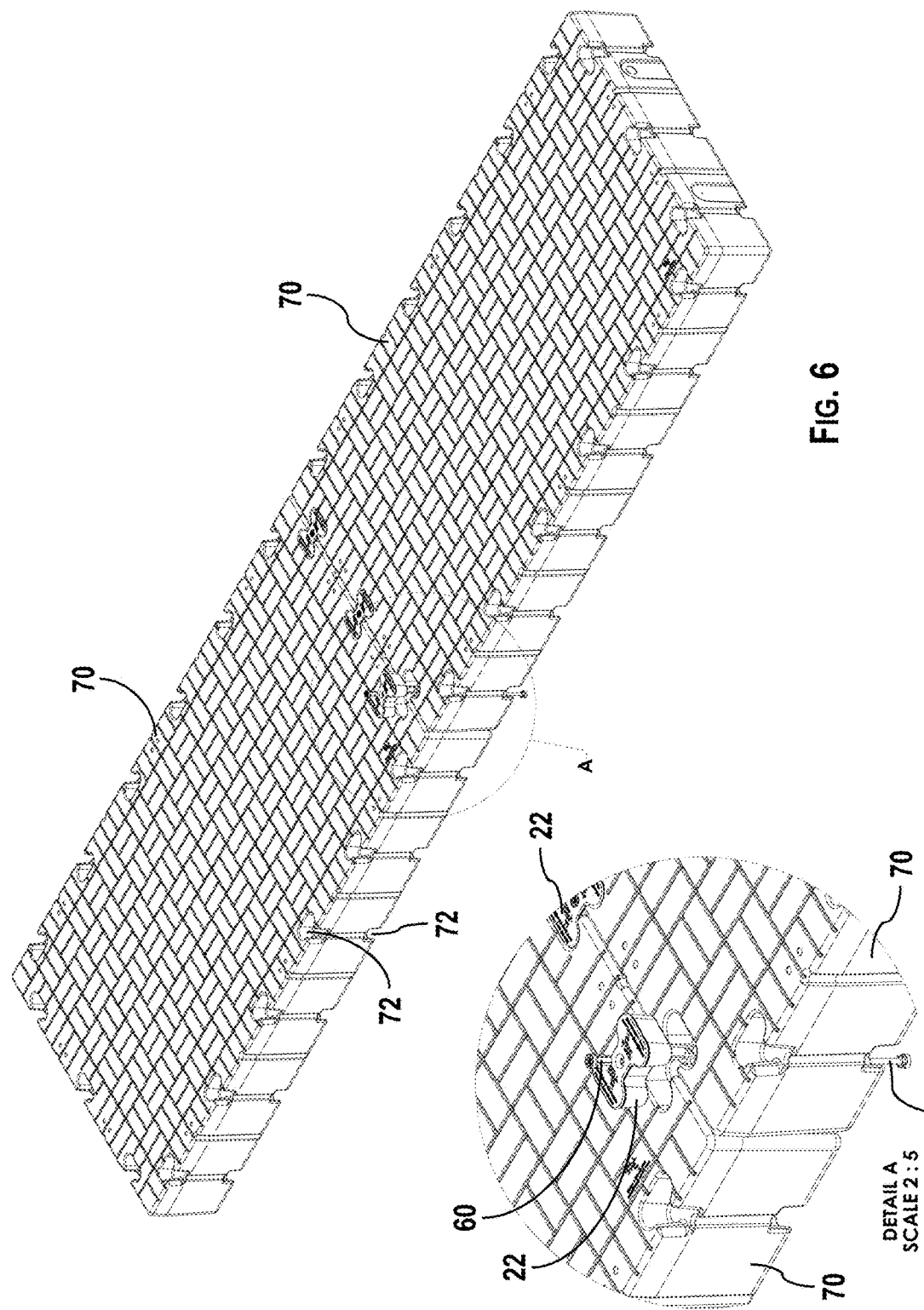

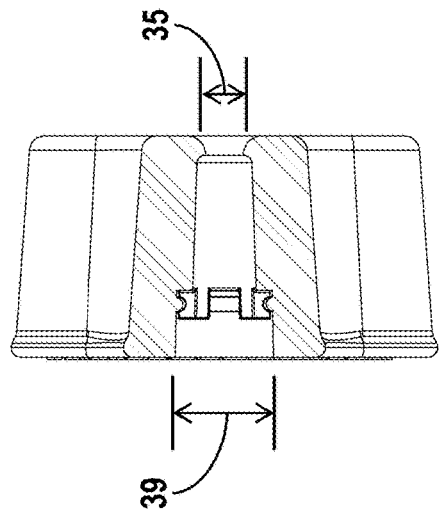
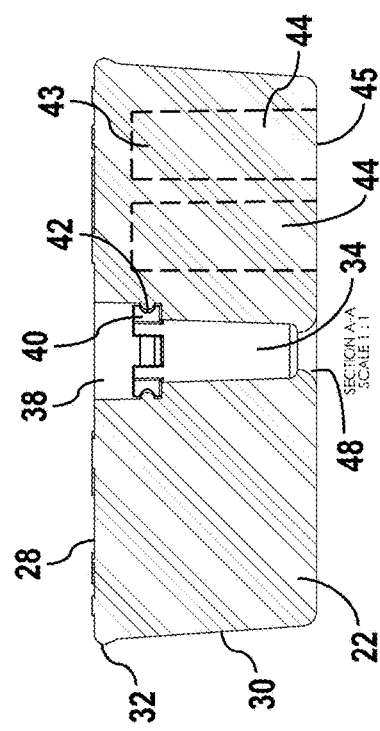
FIG. 9B
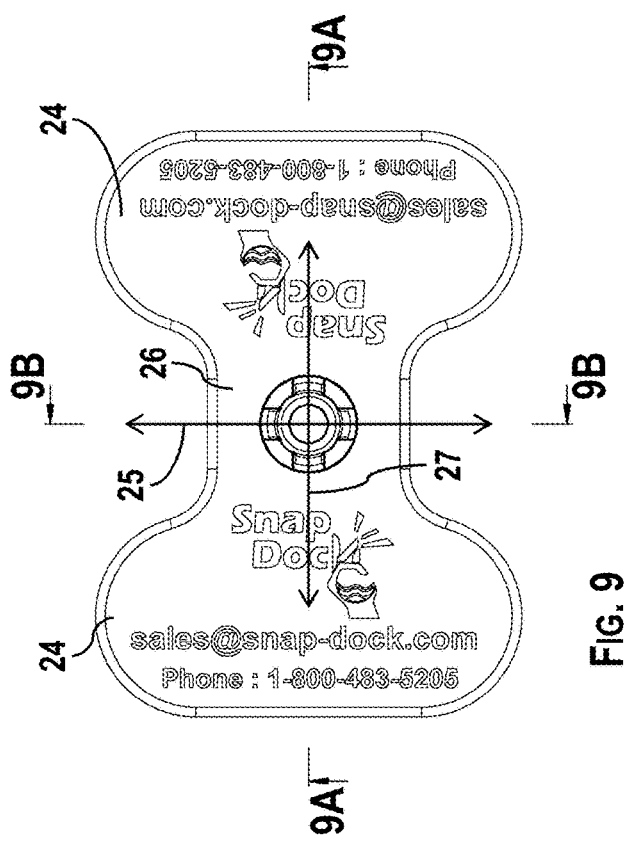
FIG. 9
FIG. 9A

CONNECTOR FOR DOCK SECTIONS

CROSS REFERENCE TO RELATED APPLICATIONS

This application claims priority under 35 U.S.C. 119(e) of U.S. provisional patent application Ser. No. 63/035,397 filed on Jun. 5, 2020 entitled CONNECTOR FOR DOCK SECTIONS WITH STRUCTURAL VOIDS TO FACILITATE INJECTION MOLDING the disclosure of which is hereby incorporated herein by reference.

BACKGROUND

Floating docks are often used for mooring watercraft. Such floating docks are often formed by connecting several separate floating dock sections. For example, a manufacturer may supply such dock sections in one or more configurations and the user may then combine these modular dock sections together to form a floating dock. The modular nature of the floating dock sections allows the user to customize the overall dock configuration to the user's particular purposes.

To facilitate the modular connectivity of the individual dock sections, it is known to form a series of sockets along the upper and lower perimeter of each of the dock sections. Adjacent dock sections are positioned next to each other such that the sockets of the adjacent dock sections are aligned with each other. Connectors are then installed in the aligned sockets to secure the adjacent dock sections together.

While known systems provide an effective system for securing the adjacent dock sections together, further improvement of this system remains desirable.

SUMMARY

The present invention provides an improved system for securing adjacent floating dock sections to each other.

The invention comprises, in one form thereof, a connector assembly for use with floating dock sections wherein each dock section includes at least one pair of sockets with one of the pair of sockets being disposed on an upper perimeter of the dock section and the other one of the pair of sockets being disposed on a lower perimeter of the dock section wherein the connector assembly includes a pair of connecting members, each of the connecting members being buoyant and defining a plurality of voids, each of the connecting members having a first retaining section and a second retaining section with a connecting section disposed between the first and second retaining sections, the first and second retaining sections of each of the connecting members being removably installable into a pair of aligned sockets of an adjacently positioned pair of dock sections; and at least one securement member, wherein, when the first and second retaining sections of a first one of the pair of connecting members is installed in an aligned pair sockets on the upper perimeter of the adjacently positioned pair of dock sections and the first and second retaining section of a second one of the pair of connecting members is installed in an aligned pair of sockets on the lower perimeter of the adjacently positioned pair of dock sections, the at least one securement member extends between the pair of connecting members and detachably secures the pair of connecting members to each other and thereby preventing withdrawal of the first and second retaining sections of each of the connecting members from the aligned sockets and securing the adjacent dock sections together.

The invention comprises, in another form thereof, a floating dock assembly that includes a pair of floating dock sections wherein each dock section includes at least one pair of sockets with one of the sockets being disposed on an upper perimeter of the dock section and the other one of the pair of sockets being disposed on a lower perimeter of the dock section; and a connector assembly wherein the connector assembly includes a pair of connecting members, each of the connecting members being buoyant and defining a plurality of voids, each of the connecting members having a first retaining section and a second retaining section with a connecting section disposed between the first and second retaining sections, the first and second retaining sections of each of the connecting members being removably installable into a pair of aligned sockets of an adjacently positioned pair of dock sections; at least one securement member, wherein, when the first and second retaining sections of a first one of the pair of connecting members is installed in an aligned pair sockets on the upper perimeter of the adjacently positioned pair of dock sections and the first and second retaining section of a second one of the pair of connecting members is installed in an aligned pair of sockets on the lower perimeter of the adjacently positioned pair of dock sections, the at least one securement member extends between the pair of connecting members and detachably secures the pair of connecting members to each other and thereby preventing withdrawal of the first and second retaining sections of each of the connecting members from the aligned sockets and securing the adjacent dock sections together; and wherein each of the pair of connecting members has a transverse outer wall with a side wall extending therefrom and defining an outer perimeter of the connecting member and wherein the plurality of voids have a closed end proximate the transverse wall and an open end opposite the transverse wall.

The invention comprises, in yet another form thereof, a connector assembly for use with floating dock sections wherein each dock section includes at least one pair of sockets with one of the pair of sockets being disposed on an upper perimeter of the dock section and the other one of the pair of sockets being disposed on a lower perimeter of the dock section wherein the connector assembly includes a pair of connecting members, each of the connecting members being buoyant and having a first retaining section and a second retaining section with a connecting section disposed between the first and second retaining sections, the first and second retaining sections of each of the connecting members being removably installable into a pair of aligned sockets of an adjacently positioned pair of dock sections; an elongate securement member, wherein, when the first and second retaining sections of a first one of the pair of connecting members is installed in an aligned pair sockets on the upper perimeter of the adjacently positioned pair of dock sections and the first and second retaining section of a second one of the pair of connecting members is installed in an aligned pair of sockets on the lower perimeter of the adjacently positioned pair of dock sections, the elongate securement member extends between the pair of connecting members and detachably secures the pair of connecting members to each other and thereby preventing withdrawal of the first and second retaining sections of each of the connecting members from the aligned sockets and securing the adjacent dock sections together; and wherein the elongate securement member is captured by one of the connecting members and the combination of the elongate threaded fastener and the one connecting member is buoyant.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 6 is a partially exploded view of the floating dock sections and connector assemblies of FIG. 5.

FIG. 7 is a detail view of FIG. 6 showing an exploded view of a connector assembly.

FIG. 9 is a top view of a connecting member.

FIG. 9A is a cross sectional view taken along line 9A-9A of FIG. 9.

FIG. 9B is a cross sectional view taken along line 9B-9B of FIG. 9.

Figure 1:
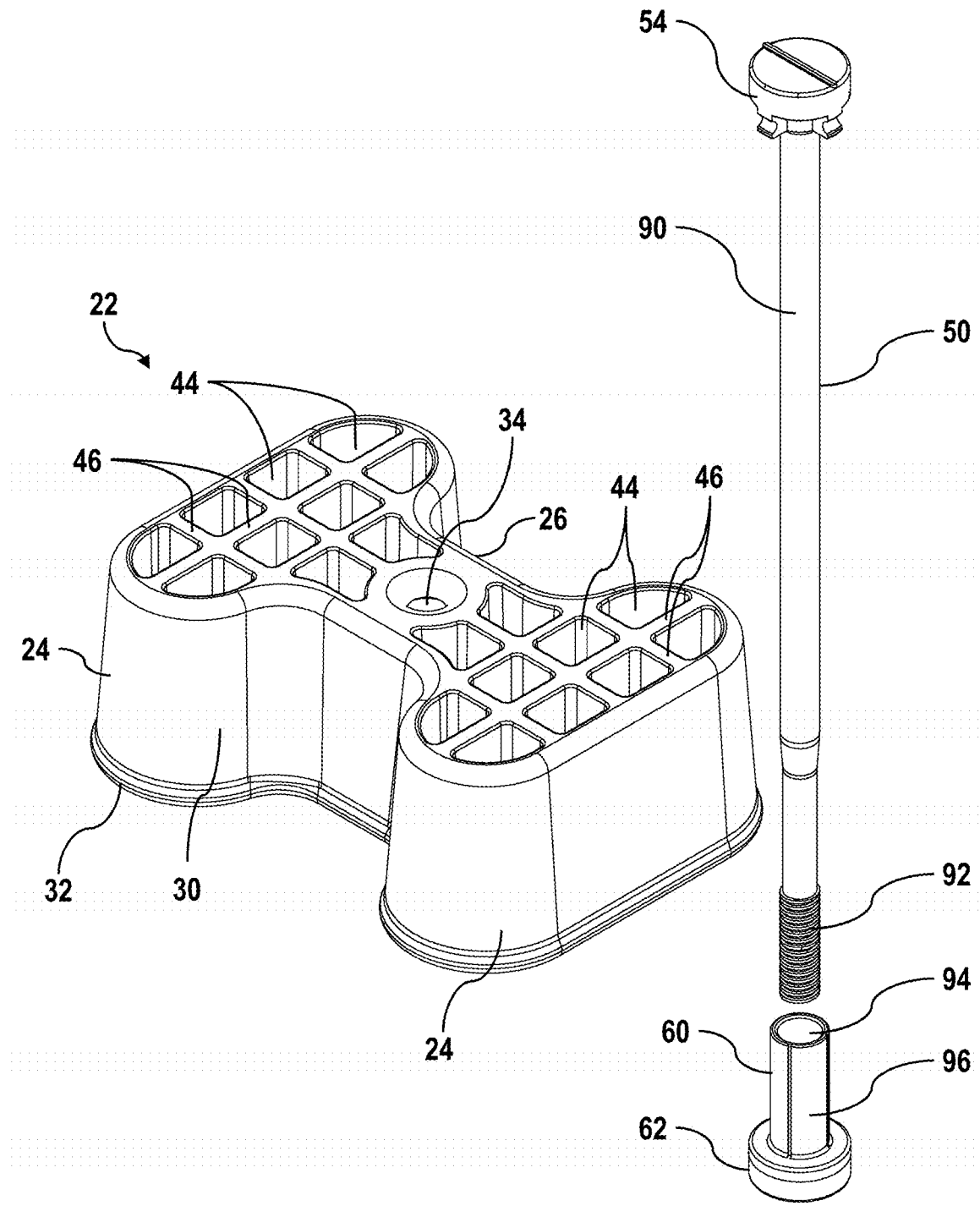
FIG. 1 is a perspective view of a connecting member and securement members.
Figure 2:
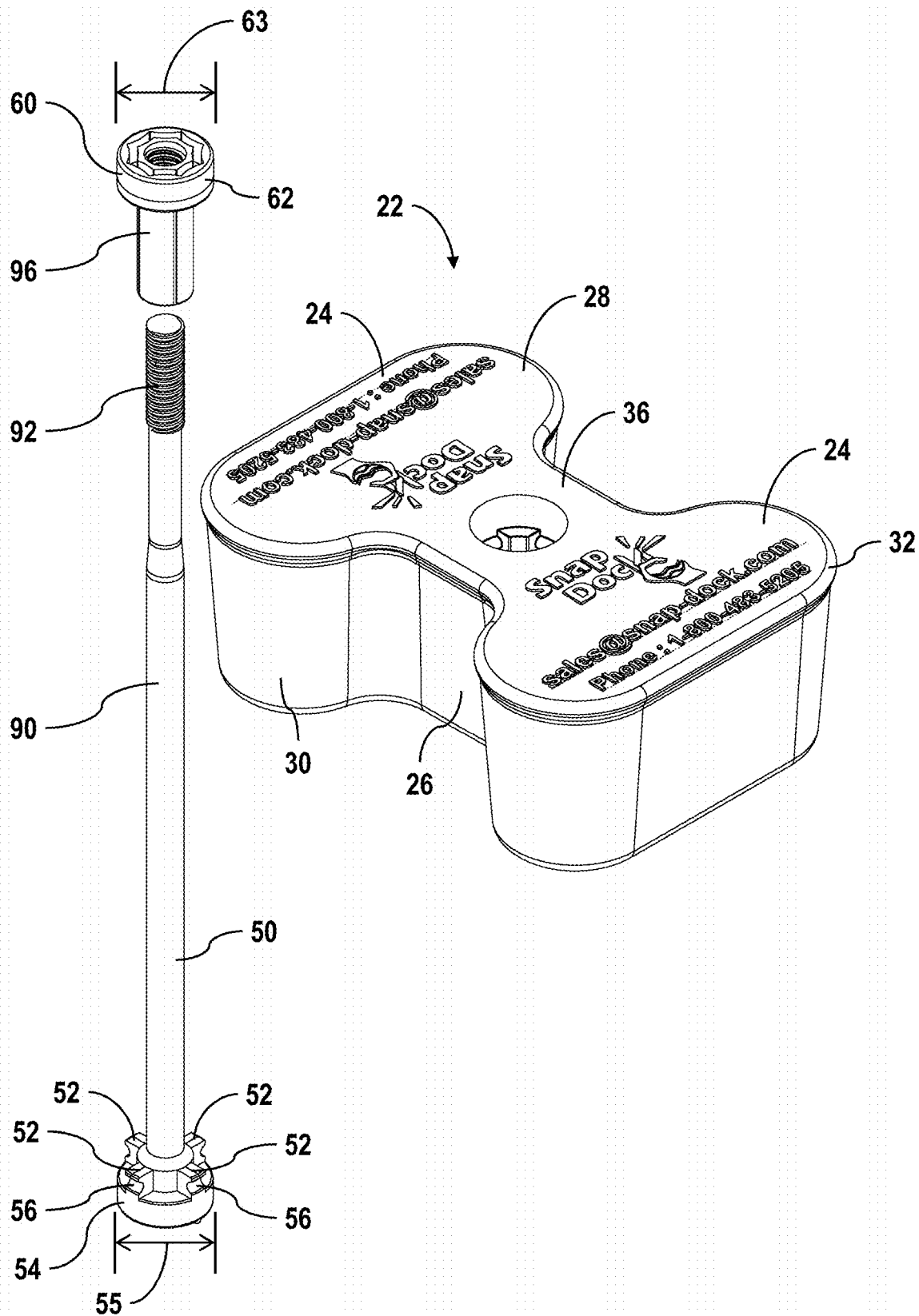
FIG. 2 is another perspective view of the connecting member and securement members of FIG. 1.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

Figure 5:
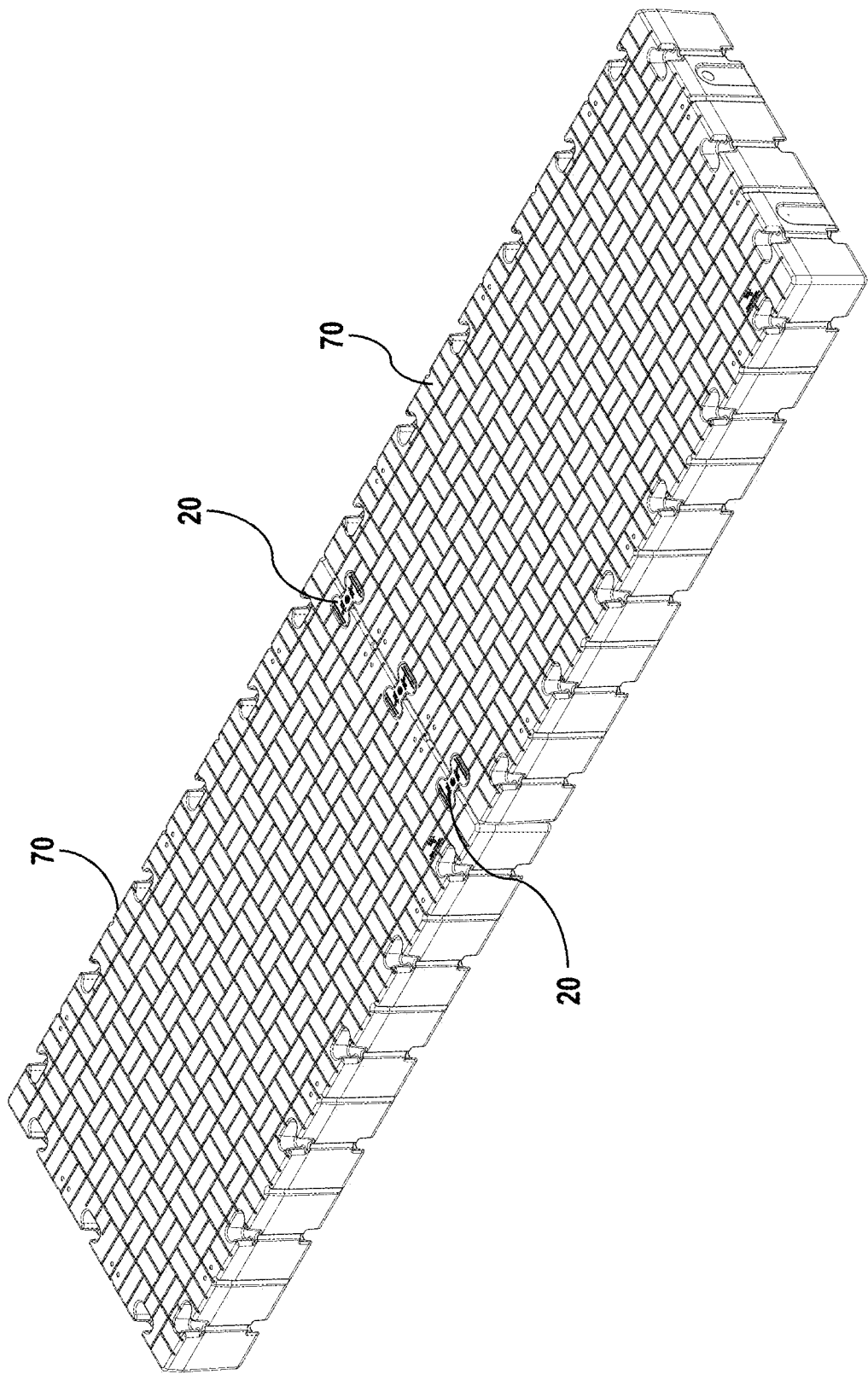
FIG. 5 is a perspective view of two floating dock sections secured together with a plurality of connector assemblies.
Figure 8A:
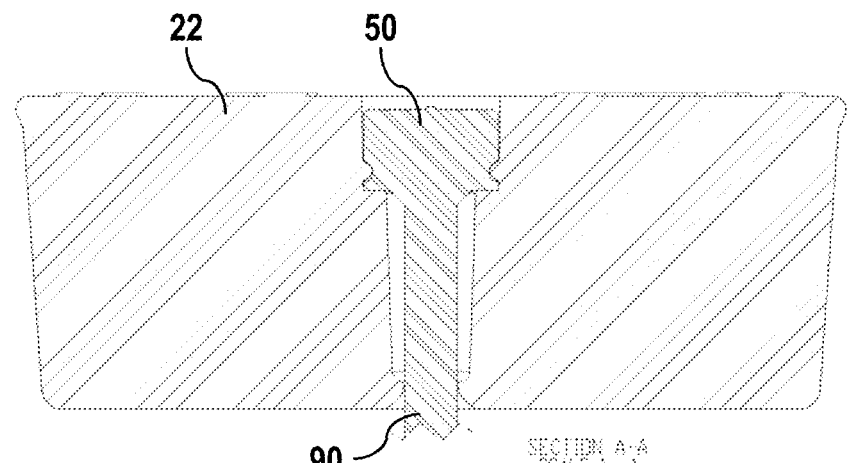
FIG. 8A is a cross sectional view taken along line 8A-8A of FIG. 8.
Figure 8:
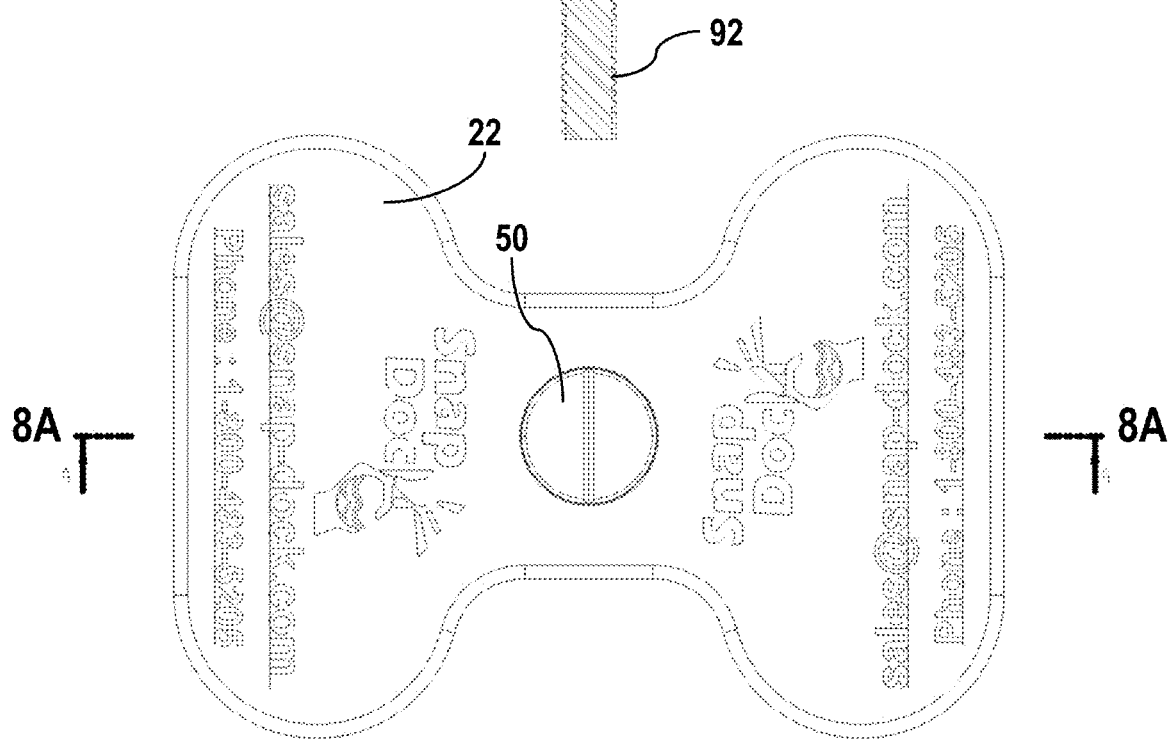
FIG. 8 is a top view of a connecting member and a securement member.
Figure 10:
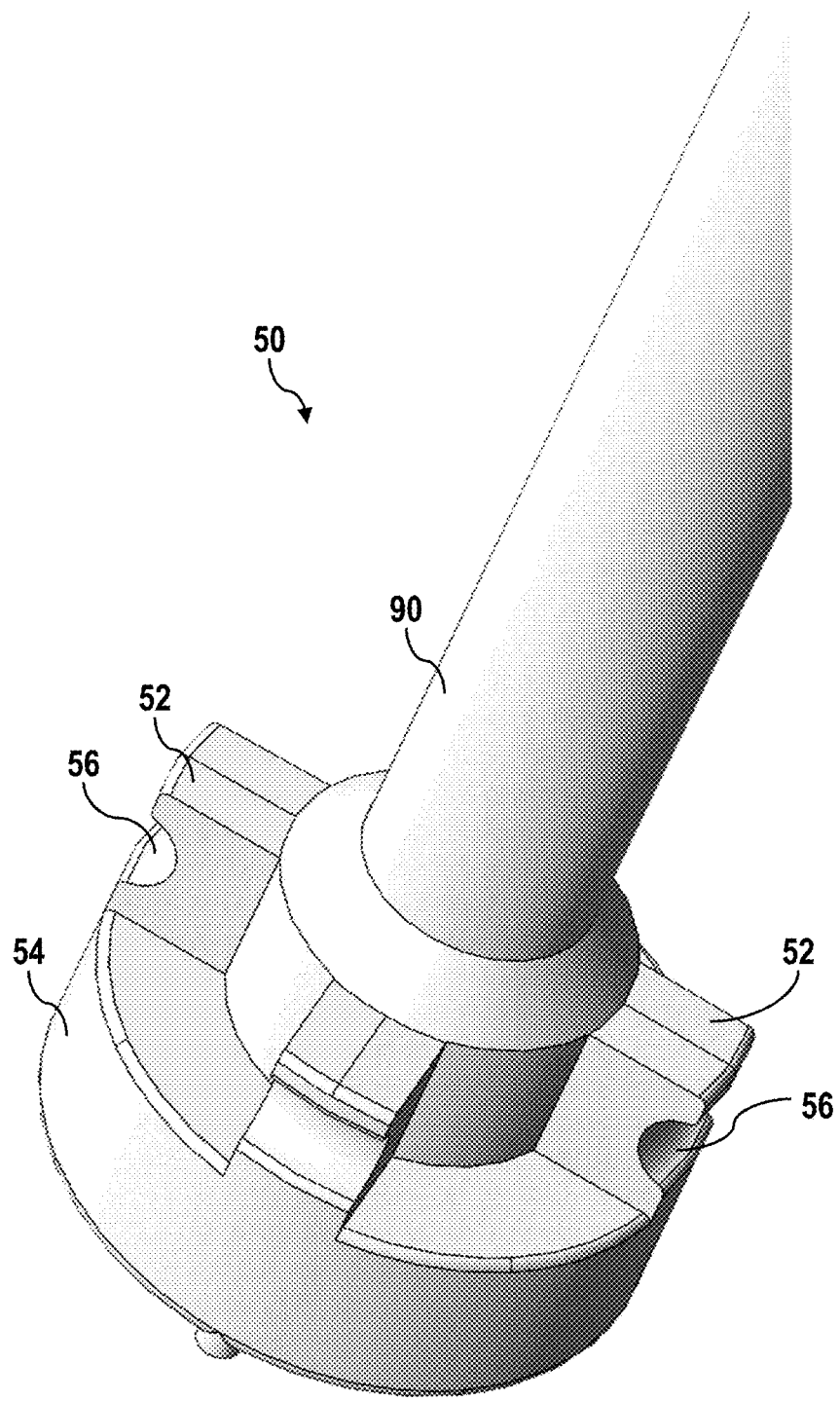
FIG. 10 is a partial perspective view of an elongate securement member.
Figure 11:
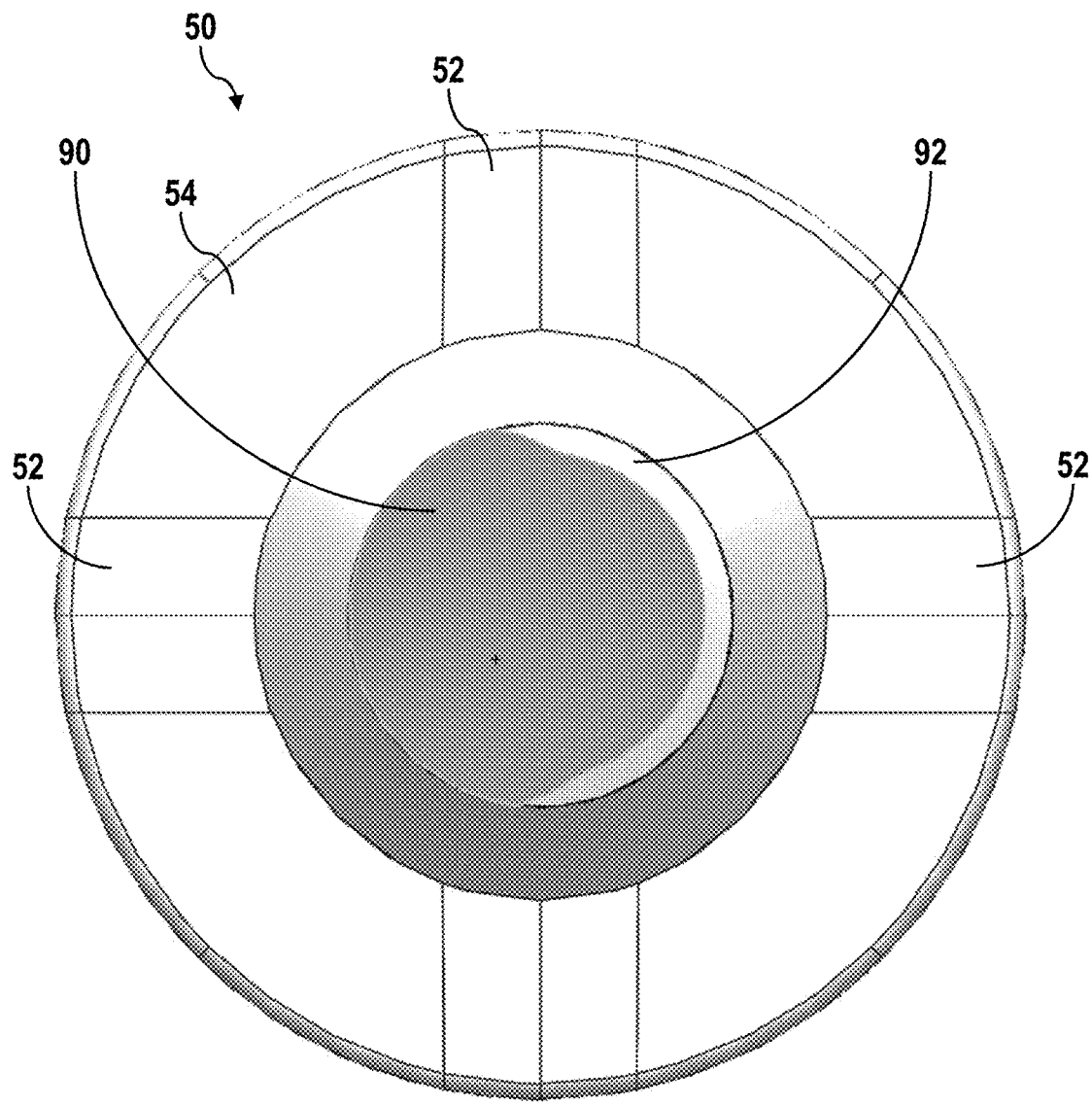
FIG. 11 is an end view of the elongate securement member of FIG. 10.
Figure 12:
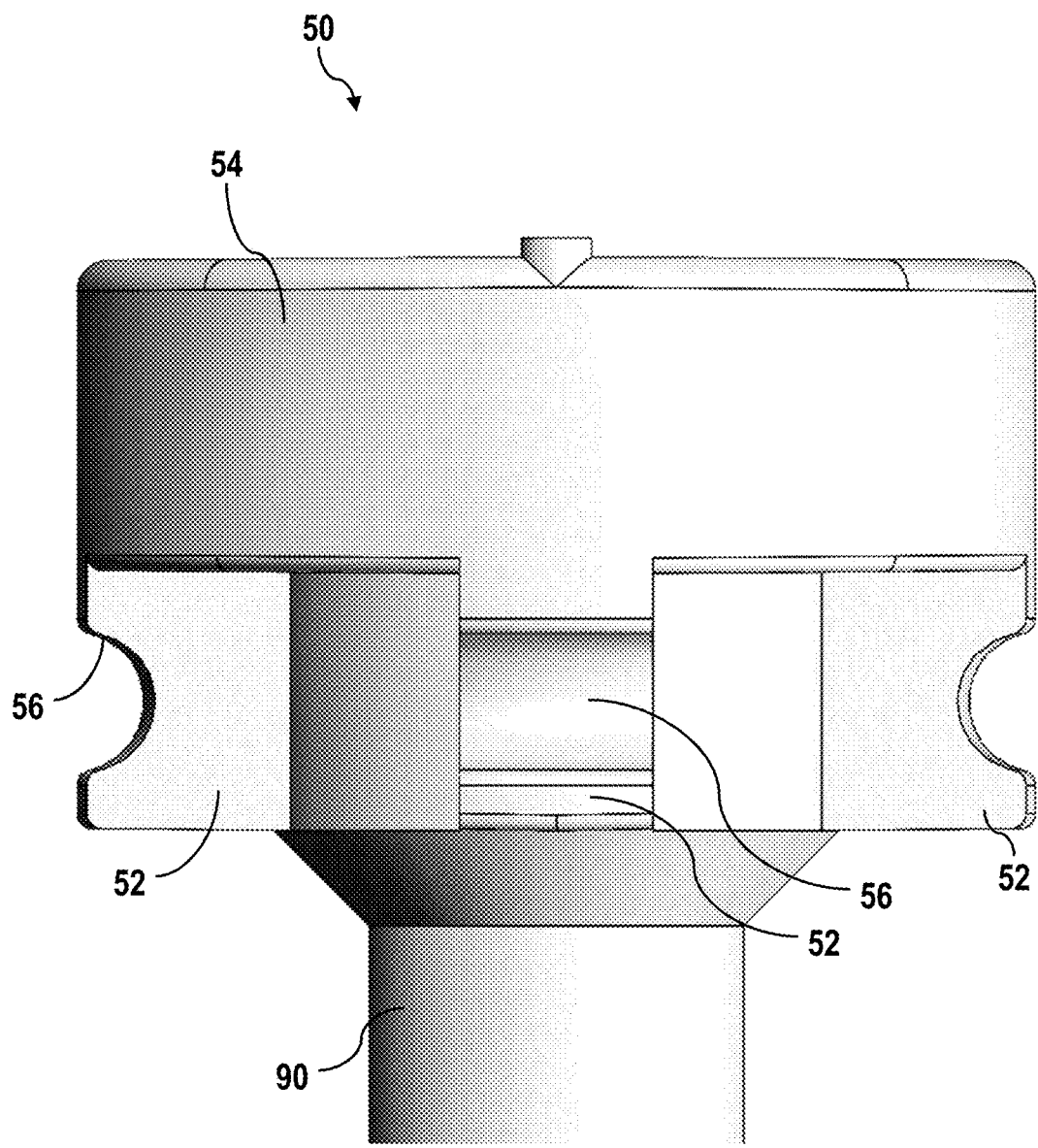
FIG. 12 is a partial side view of the elongate securement member of FIG. 10.
Figure 13:
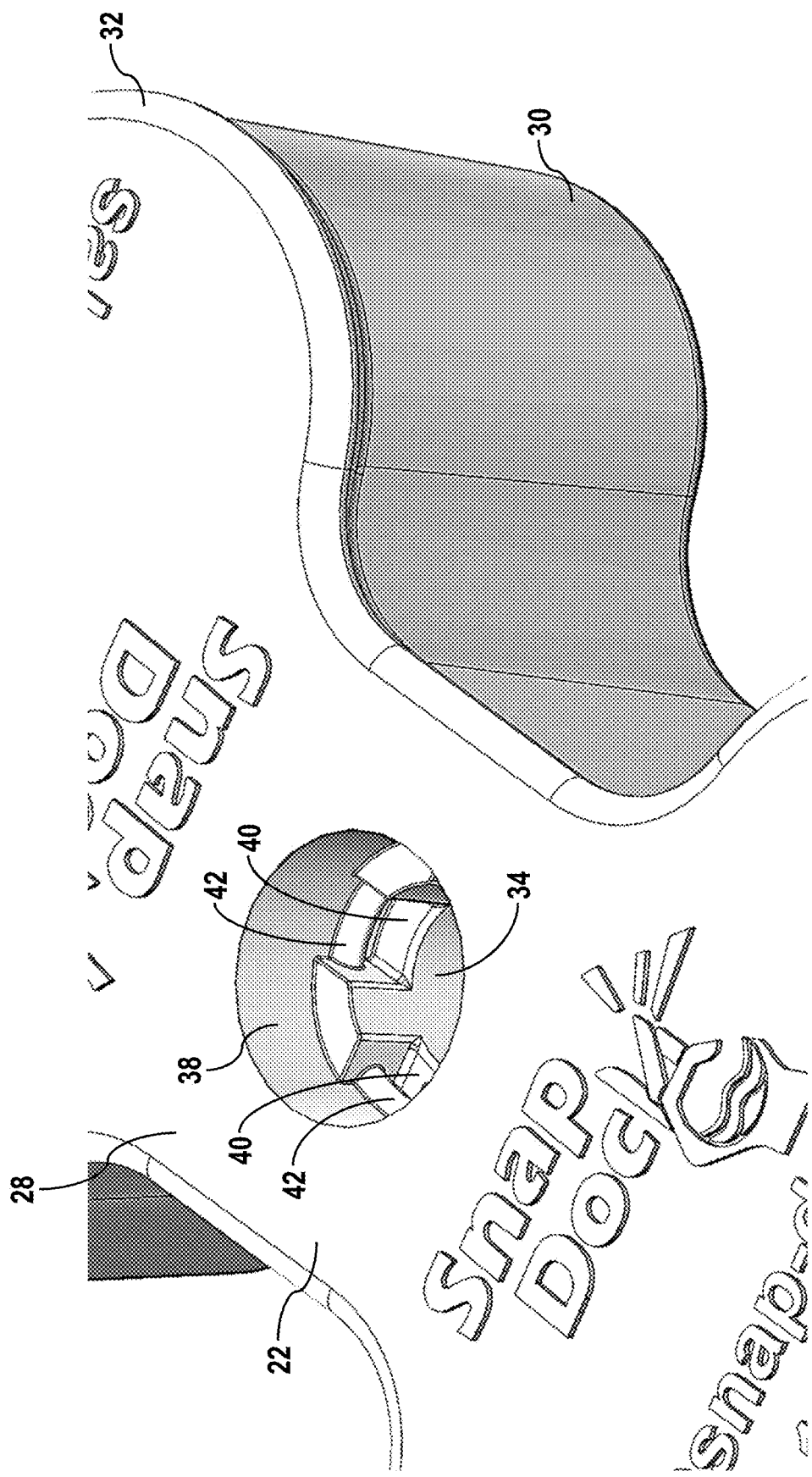
FIG. 13 is a perspective view showing a through-bore in the connecting member.
Figure 14:
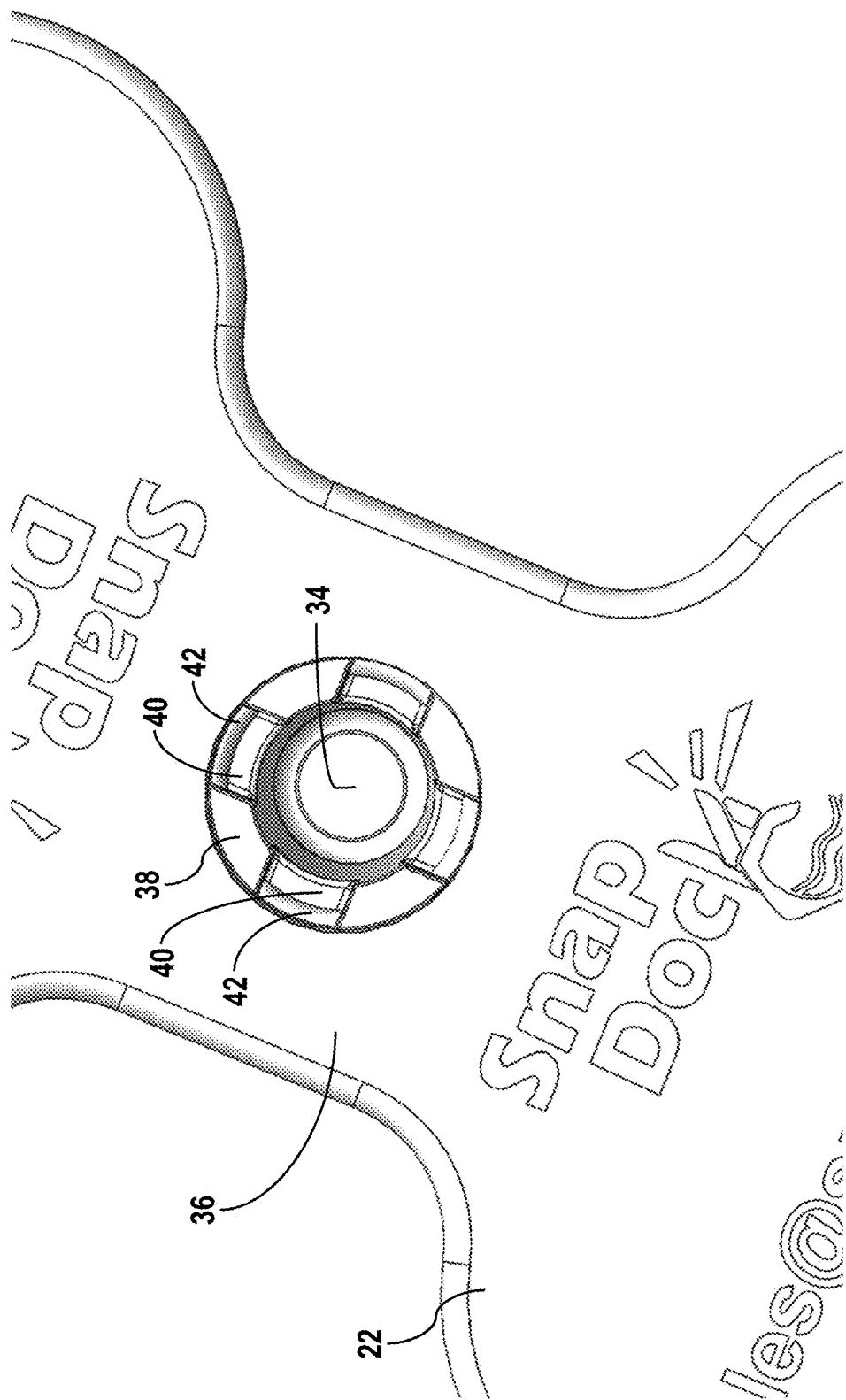
FIG. 14 is a top view showing the through-bore in the connecting member.
Figure 15:
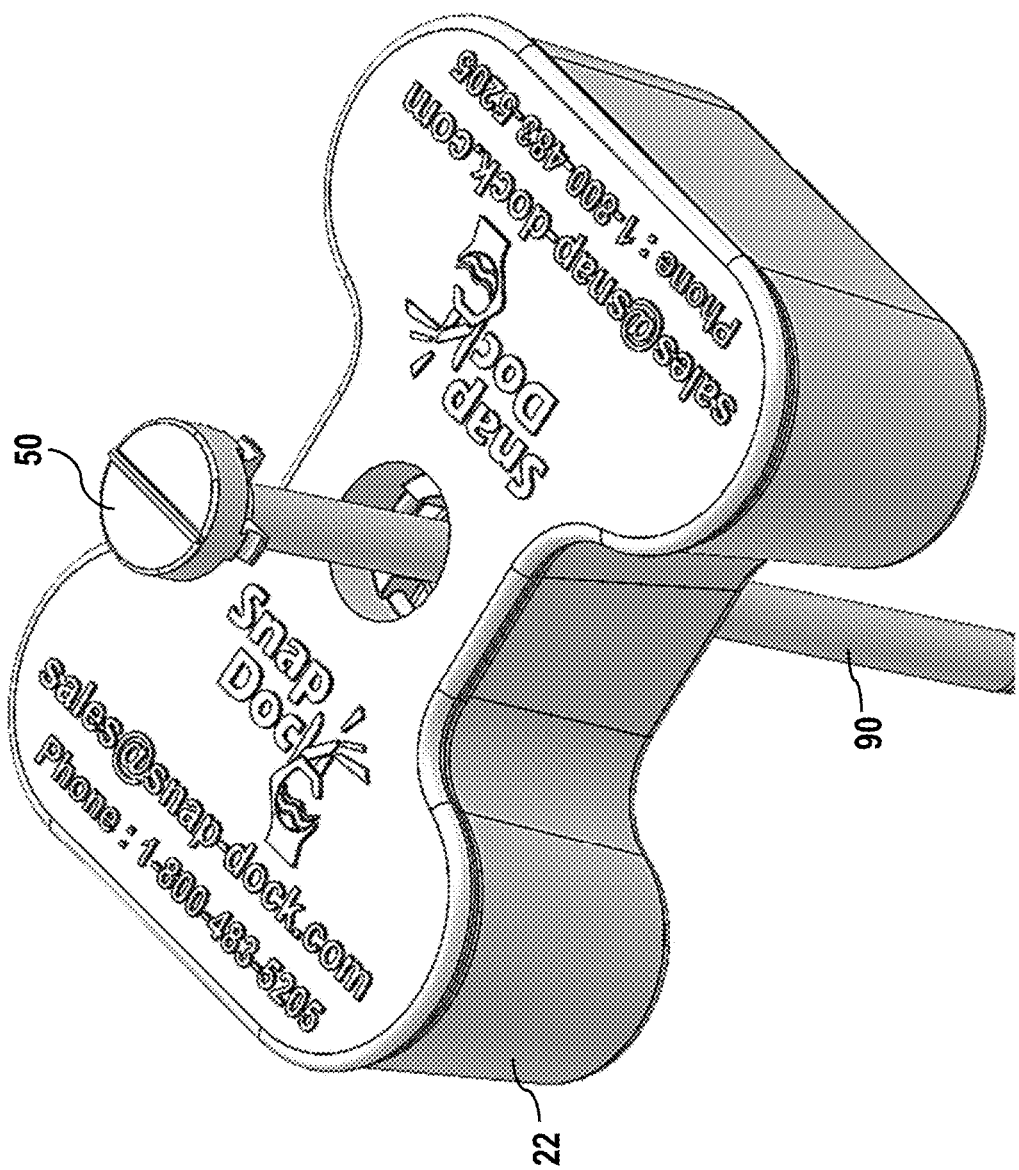
FIG. 15 is a perspective view showing a connecting member and an elongate securement member.
Figure 16:
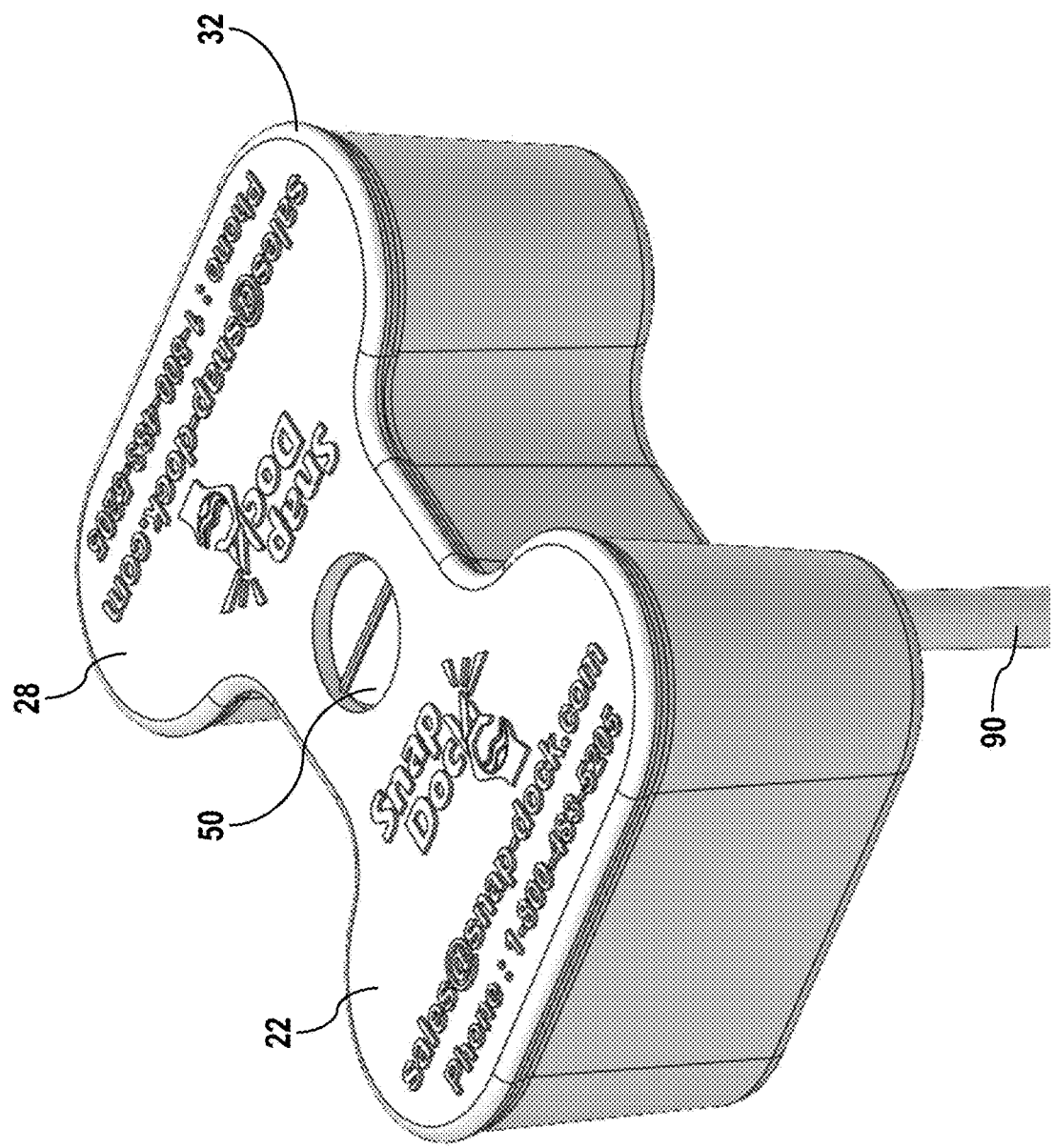
FIG. 16 is a perspective view of the connecting member and elongate securement member of FIG. 15 with the elongate securement member captured by the connecting member.

An exemplary embodiment of connector assemblies 20 being used to secure adjacent floating dock sections 70 together is shown in FIG. 5. The illustrative connector assemblies 20 each include a pair of connecting members 22 and at least one securement member. Connecting members 22 are buoyant in fresh water which, as further discussed below, is advantageous when installing or removing the connector assemblies 20.

Each of the exemplary connecting members 22 includes two retaining sections 24 and a connecting section 26 disposed between the two retaining sections 24. The retaining sections 24 are configured such that they are removably installable in a socket 72 of the floating dock sections 70.

In the illustrated embodiment, each of the connecting members has a transverse outer wall 28 with a side wall 30 extending therefrom and defining an outer perimeter of the connecting member 22. The illustrated connecting members 24 also include a lip 32 which is disposed on side wall 30 and defines the outermost lateral projection of the outer perimeter of sidewall 30. Lip 32 helps prevent the infiltration of water into sockets 72 when the retaining sections 24 are installed in sockets 72. Sidewall 30 is also slightly inclined relative to transverse wall 28 tapering inwardly as it projects away from transverse wall 28. This facilitates the removal of connecting member 22 from a mold during manufacture and also facilitates installation and removal of the retaining sections 24 from sockets 72.

Connecting section 26 extends in a first direction 27 in the plane defined by transverse wall 28 while retainer sections 24 extend outwardly relative to the connecting section 26 in a second direction 25 perpendicular to the first direction 27 in the plane defined by the transverse wall 28. As a result, the illustrated connecting members 24 have a generally dumbbell shape which is useful in securing adjacent dock sections 70 together as further discussed below. Connecting members 22 are also symmetrical about a first centerline extending in the first direction and a second centerline extending in the second direction. In FIG. 9, the first centerline coincides with line 27 showing the first direction and the second centerline coincides with the line 25 showing the second direction.

Connecting members 22 define a through-bore 34 in a center portion 36 of the connecting section 26. Through-bore 34 extends through and is perpendicular to the transverse wall 28. A countersink bore 38 is formed in transverse wall 28 and positioned coaxially with through-bore 34. Through-bore 35 defines a first diameter 35 and countersink bore 38 defines a second diameter 39 which is larger than the first diameter 35 of through-bore 34. In this regard, we note that the diameter 39 defined by the through-bore 34 is a variable diameter but the diameter 39 of countersink bore 38 is larger than the largest diameter defined by through-bore 34. Countersink bore 38 allows the head of a fastener to be positioned flush or recessed with the surface of transverse wall 28. Transverse wall 28 is, in turn, positioned flush with the surface of dock section 70 when connecting member 22 is installed in sockets 72.

Countersink bore 38 also defines a plurality of radially extending slots 40. A protrusion 42 is located within each of the illustrated slots 40. Connecting members 22 further define a plurality of voids 44. In the illustrated embodiment, voids 44 each have a closed end 43 proximate the transverse wall 28 and an open end 45 opposite the transverse wall. A plurality of interior walls 46 separate the individual voids 44.

In the illustrated embodiment, connecting members 22 are manufactured using injection molding and are formed out of a polymeric material having a specific gravity of less than 1.0 whereby the material, and objects made therefrom, will be buoyant in fresh water. Advantageously, the polymeric material is a thermoplastic elastomer. For example, a thermoplastic vulcanizate, i.e., a type of thermoplastic elastomer, having a specific gravity of 0.95 may be used to form the connecting members 22. Sarlink 3180 is one type of thermoplastic vulcanizate that can be advantageously used to form connecting members 22, however, other suitable polymeric materials may also be used. The use of voids 44 and interior walls 46 in connecting members 22 reduces the amount of material necessary to form members 22 while the interior honeycomb like structure of the interior walls provides a relatively strong and flexible structure.

Voids 40 also assist in providing buoyancy and may be used in combination with a material having a specific gravity of more than 1.0 to provide a buoyant connecting member. While the illustrated voids 44 are open voids, alternative embodiments could employ closed voids. Moreover, even open voids can help provide buoyancy. For example, the elongate nature of voids 40 will typically trap some air within the voids if the connecting member 22 is dropped into the water.

One or more securement members are used to secure two connecting members 24 together when securing dock sections 70 together. In the illustrated embodiment, the securement member assembly includes an elongate securement member 50 and a shorter second securement member 60.

When securing two adjacent dock sections 70 together, the dock sections 70 are positioned to align a set of upper and lower sockets 72 on one dock section 70 with a set of upper and lower sockets 72 on the other dock section. One connecting member 22 is positioned with its retaining sections 24 in the aligned sockets 72 on the upper perimeter of the dock sections and a second connecting member 22 is positioned with its retaining sections 24 in the aligned sockets 72 on the lower perimeter of the dock sections. Securement members 50, 60 extend between the pair of connecting members 22 to detachably secure the connecting members 22 to each other. This prevents the withdrawal of the retaining sections 24 from the sockets 72 and thereby secures the adjacent dock sections 70 together.

In the illustrated embodiment, securement member 50 is an elongate threaded fastener that extends between the pair of connecting members 22. Securement member 50 includes a radially extending flanged portion 54 from which extends an elongate shaft 90 which has an external helical thread 92 on its distal portion. The flanged portion, or head, 54 of member 50 is received in countersink bore 38 with shaft 90 extending through the through-bore 34. In this regard, it is noted that flanged portion 54 defines a diameter 55 larger than the largest diameter 35 defined by through-bore 34 but no larger than the diameter 39 of countersink bore 38 whereby the flanged portion 54 fits within countersink bore 38. The diameter of shaft 90 and thread 92 is no larger than the smallest diameter 35 of through-bore 34 whereby the shaft 90 can be inserted therethrough.

Securement member 50 also includes a plurality of radially extending ribs 52 adjacent radially extending flanged portion 54 that fit into slots 40 when the radially extending flanged portion 54 of elongate member 50 is positioned in a countersink bore 38. The positioning of ribs 52 in slots 40 rotationally fixes elongate member 50 relative to the connecting member 22.

In the illustrated embodiment, the plurality of ribs 52 engage the plurality of slots 40 in a press-fit or interference fit engagement to thereby capture the elongate member in a rotationally fixed position on the connecting member. In the illustrated embodiment, ribs 52 include a recess 56 into which protrusion 42 fits to thereby releasably capture securement member 50 with an interference fit. In the illustrated embodiment, securement member 50 is installed in the securement member 50 by pounding it into place with a hammer or mallet. A radially inwardly projecting lip 48 within through-bore 34 opposite countersink bore 38 engages shaft 90. This also helps retain elongate member 50 in its captured position and prevent water from entering through-bore 34. Other forms of releasably or permanently capturing securement member 50 on connecting member 22 may also be used.

Second securement member 60 includes a shaft 96 which has a threaded bore 94 at its distal end. Threaded bore 94 receives and engages the threaded shaft of elongate securement member 50 to thereby secure members 50, 60 together. Securement member 60 also includes a radially extending flanged portion 62, or head, which is removably positionable in the countersink bore 38 of a connecting member 22 and defines a diameter 63 larger than the diameter 35 of through-bore 34 and no larger than the diameter 39 of countersink bore 38. Shaft 96 has a diameter smaller than the diameter 35 of through-bore 34 whereby shaft 96 is insertable therein when flanged portion 62 is seated in countersink bore 38.

Securement member 60 is freely rotatable within connecting member 22 when installed therein. In the illustrated embodiment, flanged portion 62 defines a hex or star shaped recess whereby a driving bit may be inserted therein to drivingly rotate securement member 60 to threadingly engage securement member 60 with securement member 50. Other methods of rotating securement member 60 may also be used.

Both securement member 50 and securement member 60 are formed out nylon 66 in the illustrated embodiment. However, alternative material could also be used. For example, a non-rusting metal material could be used to form the securement members. Such a metallic members would also be well suited for use a molded-in insert. For example a metallic member 50 could be a molded-in insert that extends from one of the connecting members 22. Various other modifications in configuration and manufacture could also be employed with the securement members 50, 60.

The capturing of elongate member 50 on connecting member 22 is particularly advantageous when undertaking the process of securing two floating dock sections 70 together. In the illustrated embodiment, the combination of the captured elongate securement member 50 and the connecting member 22 is buoyant. Thus, if dock sections 70 were being secured together while the dock sections 70 were floating in a water body, and this combination of the securement member 50 and connecting member 22 were accidently dropped into the water body, the connecting member 22 and the captured securement member 50 would float on the water surface thereby making their retrieval a relatively simple task.

Figure 4:
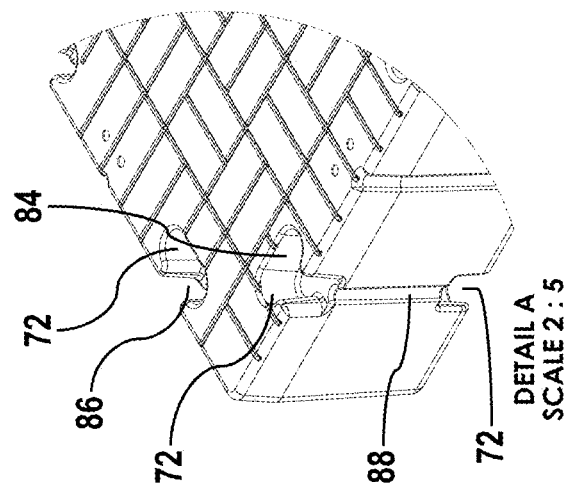
FIG. 4 is a detail view of the floating dock section of FIG. 3.
Figure 3:
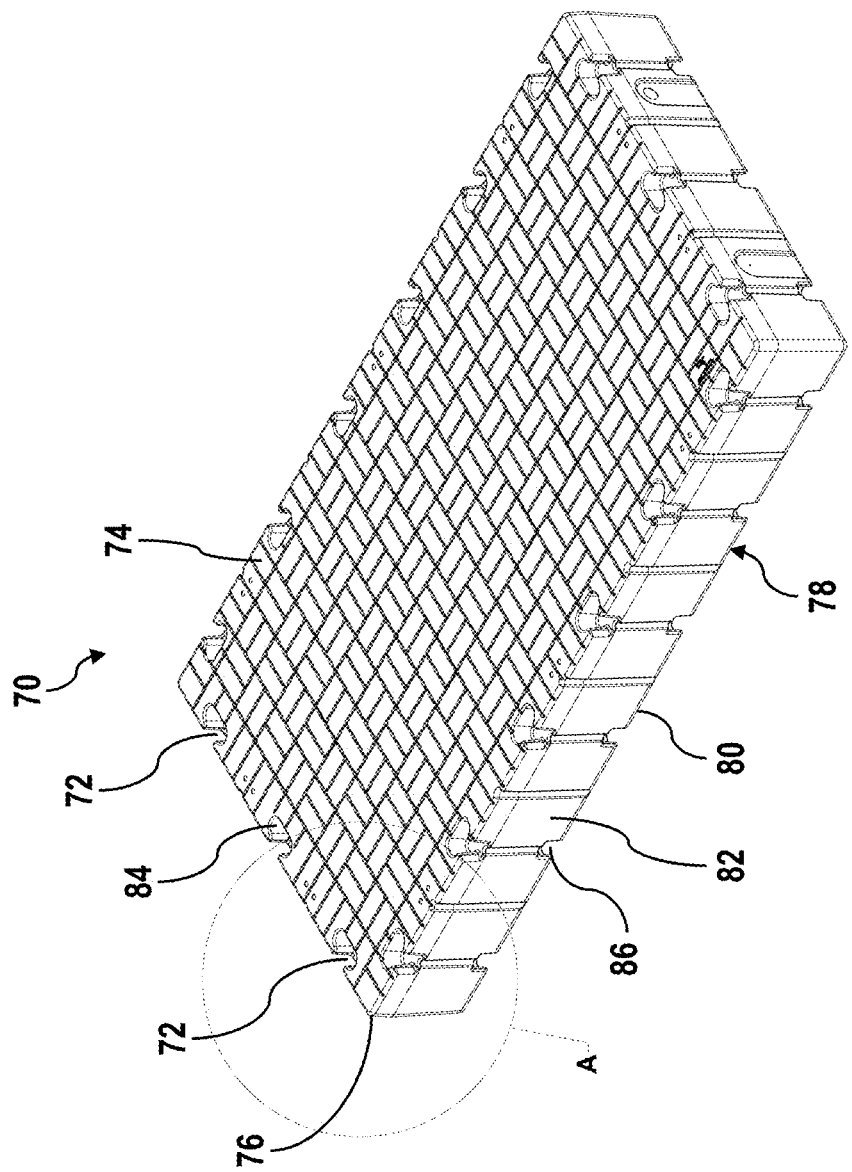
FIG. 3 is a perspective view of a floating dock section.

As best seen in FIGS. 3 and 4, floating dock sections 70 include a plurality of sockets 72 which are evenly distributed along upper perimeter 76 and lower perimeter 80 of the dock sections. The dock sections include a planar upper surface 74 and an opposing bottom surface 78 that is also planar and substantially identical to upper surface 74. A sidewall 82 extends between the upper and lower surfaces 74, 78.

The sockets 72 are arranged in pairs such that for every socket 72 along the upper perimeter 76 there is another socket 72 directly opposite that socket on the lower perimeter 80. The socket on the upper perimeter 76 has a surface opening 84 formed in upper surface 74 and a sidewall opening 86 formed in sidewall 82. Similarly, the sockets along the lower perimeter 80 have identical sockets which have a surface opening 84 formed in the lower surface 78 and a sidewall opening 86 formed in sidewall 82.

Surface openings 84 are shaped to closely receive a retaining section 24 of a connecting member and sidewall opening 86 is configured to allow connecting section 26 to extend therethrough but small enough to prevent retaining section 24 from being pulled laterally therethrough. Retaining sections 24 are only installable into and removably from the socket through a surface opening 84.

A half-bore recess 88 formed in sidewall 82 connects the two opposing sockets. When two dock sections 70 are positioned adjacent to each other with an aligned set of sockets 72, the two half-bore recesses 88 of the adjacent dock sections 70 will form a bore through which shaft 90 will extend between the two connecting members 22 disposed in the sockets. It will generally be most convenient to install the connecting member 22 having elongate fastener 50 captured therein in the two lower aligned sockets so that the elongate shaft 90 will extend upwardly through aligned recesses 88. The engagement of lip 32 with sockets 72 along the lower perimeter will help to hold the connecting member 22 and captured securement member 50 in place during the installation of the second connecting member 22 and securement member 60. During installation of this second connecting member 22, threaded shaft 90 is engaged with a securement member 60 that is inserted in the through-bore of the connecting member 22 that has been positioned in the aligned sockets along the upper perimeter. FIG. 5 illustrates a pair of floating dock sections 70 that have been secured together with connector assemblies 20.

While this invention has been described as having an exemplary design, the present invention may be further modified within the spirit and scope of this disclosure. This application is therefore intended to cover any variations, uses, or adaptations of the invention using its general principles.

What is claimed is:

1. A connector assembly for use with floating dock sections wherein each dock section includes at least one pair of sockets with one of the pair of sockets being disposed on an upper perimeter of the dock section and the other one of the pair of sockets being disposed on a lower perimeter of the dock section, the connector assembly comprising:
    a pair of connecting members, each of the connecting members being buoyant and defining a plurality of voids, each of the connecting members having a first retaining section and a second retaining section with a connecting section disposed between the first and second retaining sections, the first and second retaining sections of each of the connecting members being removably installable into a pair of aligned sockets of an adjacently positioned pair of dock sections;
    at least one securement member, wherein, when the first and second retaining sections of a first one of the pair of connecting members is installed in an aligned pair sockets on the upper perimeter of the adjacently positioned pair of dock sections and the first and second retaining section of a second one of the pair of connecting members is installed in an aligned pair of sockets on the lower perimeter of the adjacently positioned pair of dock sections, the at least one securement member extends between the pair of connecting members and detachably secures the pair of connecting members to each other and thereby preventing withdrawal of the first and second retaining sections of each of the connecting members from the aligned sockets and securing the adjacent dock sections together;
    wherein each of the pair of connecting members has a transverse outer wall with a side wall extending therefrom and defining an outer perimeter of the connecting member and wherein the plurality of voids have a closed end proximate the transverse wall and an open end opposite the transverse wall;
    wherein the at least one securement member includes an elongate member extending between the pair of connecting members and the elongate member is a threaded fastener which is captured by one of the connecting members;
    wherein a through-bore having a first diameter extends through the connecting member intersects the transverse wall at a perpendicular angle and a countersink bore having a second diameter is formed in the transverse wall and positioned coaxially with the through-bore, the second diameter being larger than the first diameter; and
    wherein each connector assembly includes a second securement member threadingly engageable with the elongate member, the elongate member and the second securement member each having a radially extending flanged portion removeably positionable in the countersink bore of one of the connecting members and having a third diameter larger than the first diameter.

2. The connector assembly of claim 1 wherein, for each of the pair of connecting members, the connector section extends in a first direction in a plane defined by the transverse wall and the retainer sections extend outwardly relative to the connector section in a second direction perpendicular to the first direction in the plane defined by the transverse wall.

3. The connector assembly of claim 2 wherein each of the connecting members are symmetrical about a first centerline extending in the first direction and a second centerline extending in the second direction and wherein each of the connecting members defines a plurality of interior walls separating the plurality of voids.

4. The connector assembly of claim 1 wherein the countersink bore includes a plurality of radially extending slots and the elongate member includes a corresponding plurality of radially extending ribs positionable in the plurality of slots whereby the elongate member is rotationally fixed relative to the connecting member when the radially extending flanged portion of the elongate member is disposed in the countersink bore.

5. The connector assembly of claim 4 wherein the plurality of ribs engage the plurality of slots in a press-fit or interference fit engagement to thereby capture the elongate member in a rotationally fixed position on the connecting member.

6. A floating dock assembly comprising:
    a pair of floating dock sections wherein each dock section includes at least one pair of sockets with one of the sockets being disposed on an upper perimeter of the dock section and the other one of the pair of sockets being disposed on a lower perimeter of the dock section;
    a connector assembly comprising:
        a pair of connecting members, each of the connecting members being buoyant and defining a plurality of voids, each of the connecting members having a first retaining section and a second retaining section with a connecting section disposed between the first and second retaining sections, the first and second retaining sections of each of the connecting members being removably installable into a pair of aligned sockets of an adjacently positioned pair of dock sections;
        at least one securement member, wherein, when the first and second retaining sections of a first one of the pair of connecting members is installed in an aligned pair sockets on the upper perimeter of the adjacently positioned pair of dock sections and the first and second retaining section of a second one of the pair of connecting members is installed in an aligned pair of sockets on the lower perimeter of the adjacently positioned pair of dock sections, the at least one securement member extends between the pair of connecting members and detachably secures the pair of connecting members to each other and thereby preventing withdrawal of the first and second retaining sections of each of the connecting members from the aligned sockets and securing the adjacent dock sections together;

wherein each of the pair of connecting members has a transverse outer wall with a side wall extending therefrom and defining an outer perimeter of the connecting member and wherein the plurality of voids have a closed end proximate the transverse wall and an open end opposite the transverse wall;

wherein the at least one securement member includes an elongate threaded fastener extending between the pair of connecting members wherein the elongate threaded fastener is captured by one of the connecting members and the combination of the elongate threaded fastener and the one connecting member is buoyant;

wherein a through-bore having a first diameter extends through the connecting member intersects the transverse wall at a perpendicular angle and a countersink bore having a second diameter is formed in the transverse wall and positioned coaxially with the through-bore, the second diameter being larger than the first diameter; and wherein each connector assembly includes a second securement member threadingly engageable with the elongate member, the elongate member and the second securement member each having a radially extending flanged portion removeably positionable in the countersink bore of one of the connecting members and having a third diameter larger than the first diameter.

7. The floating dock assembly of claim 6 wherein the countersink bore includes a plurality of radially extending slots and the elongate member includes a corresponding plurality of radially extending ribs positionable in the plurality of slots whereby the elongate member is rotationally fixed relative to the connecting member when the radially extending flanged portion of the elongate member is disposed in the countersink bore.

8. The floating dock assembly of claim 7 wherein the plurality of ribs engage the plurality of slots in a press-fit or interference fit engagement to thereby capture the elongate member in a rotationally fixed position on the connecting member.

9. A connector assembly for use with floating dock sections wherein each dock section includes at least one pair of sockets with one of the pair of sockets being disposed on an upper perimeter of the dock section and the other one of the pair of sockets being disposed on a lower perimeter of the dock section, the connector assembly comprising:

a pair of connecting members, each of the connecting members being buoyant and having a first retaining section and a second retaining section with a connecting section disposed between the first and second retaining sections, the first and second retaining sections of each of the connecting members being removably installable into a pair of aligned sockets of an adjacently positioned pair of dock sections;

an elongate securement member, wherein, when the first and second retaining sections of a first one of the pair of connecting members is installed in an aligned pair sockets on the upper perimeter of the adjacently positioned pair of dock sections and the first and second retaining section of a second one of the pair of connecting members is installed in an aligned pair of sockets on the lower perimeter of the adjacently positioned pair of dock sections, the elongate securement member extends between the pair of connecting members and detachably secures the pair of connecting members to each other and thereby preventing withdrawal of the first and second retaining sections of each of the connecting members from the aligned sockets and securing the adjacent dock sections together; and wherein the elongate securement member is captured by one of the connecting members and the combination of the elongate securement member and the one connecting member is buoyant;

wherein the elongate securement member is a threaded fastener and wherein a through-bore having a first diameter extends through the connecting member intersects the transverse wall at a perpendicular angle and a countersink bore having a second diameter is formed in the transverse wall and positioned coaxially with the through-bore, the second diameter being larger than the first diameter; and wherein each connector assembly includes a second securement member threadingly engageable with the elongate securement member, the elongate member and the second securement member each having a radially extending flanged portion removeably positionable in the countersink bore of one of the connecting members and having a third diameter larger than the first diameter.

10. The connector assembly of claim 9 wherein the countersink bore includes a plurality of radially extending slots and the elongate member includes a corresponding plurality of radially extending ribs positionable in the plurality of slots whereby the elongate member is rotationally fixed relative to the connecting member when the radially extending flanged portion of the elongate member is disposed in the countersink bore.

11. The connector assembly of claim 10 wherein the plurality of ribs engage the plurality of slots in a press-fit or interference fit engagement to thereby capture the elongate member in a rotationally fixed position on the connecting member.

12. The floating dock assembly of claim 6 wherein, for each of the pair of connecting members, the connector section extends in a first direction in a plane defined by the transverse wall and the retainer sections extend outwardly relative to the connector section in a second direction perpendicular to the first direction in the plane defined by the transverse wall.

* * * * *